Patented Jan. 16, 1934

1,943,584

UNITED STATES PATENT OFFICE 1,943,584

INORGANIC GEL COMPOSITION

Roy Cross, Kansas City, Mo., assignor to Silica Products Co., Kansas City, Mo., a corporation of Delaware No Drawing. Application March 28, 1929
Serial No. 350,823

7 Claims. (Cl. 252—6)

This invention is a continuation in part of application Serial No. 268,800, filed April 9, 1928, and covers more specific features relative to the production and use of plastic inorganic materials and emulsions.

It relates particularly to the behavior of natural and artificial hydrous silicates of alumina which have the property of normal swelling to a greater or lesser degree in the presence of water. Natural silicates of this type have been found which are capable of forming a fairly stiff gel with from two to twenty parts of water though the product of the best commercial deposits representing the average material is practically never found which will form a gel when more than ten parts of water are used. However, when these inorganic swelling clays or hydrous silicates are mixed with a small amount of an alkali earth silicate it has the property of forming a gel in many cases with five times as much water as is the case before the alkali earth silicate is added. An alkali silicate improves the jelling properties but the greatest effect seems to be obtained from alkali earth silicates; also similar improvement is obtained by the action of alkaline substances of any kind such as lime (calcium oxide or hydroxide), alkali phosphate, carbonate, etc.

While, as stated above, alkaline substances such as lime are effective in getting exactly the right results, they must be used in such amount and with such amount of water as to give the right hydroxyl ion concentration or hydrogen ion concentration. It is very important to have this reaction or hydrogen ion concentration kept within fairly narrow limits to get the maximum gel effect. In the case of lime, this hydrogen ion concentration will vary with the amount of lime and due to the dilution effect. Too much lime or too far on the alkaline side diminishes the strength of the gel. For this reason, alkaline earth silicates or Portland cement have been satisfactory. But even here, in the case of Portland cement containing large excess of free lime, too much alkalinity may result; whereas in some cases the alkalinity might be insufficient. For this reason, in certain cases where economic conditions will permit, alkaline substances of exactly the right hydrogen ion concentration may be advantageously used. One of these substances is magnesium oxide. Being practically a pure substance and giving practically the same hydrogen ion concentrations regardless of dilution, it has been found very useful. In some localities, of course, the cost is excessive. In such cases it is desirable to use burned dolomite or calcined magnesite.

For this purpose the dolomite or magnesite should be burned to a temperature that will effect decomposition of the magnesium carbonate to magnesium oxide, but will not effect any appreciable decomposition of the calcium carbonate to calcium oxide. The burning of dolomite at temperatures between 250° C. and 825° C. has therefore been effective in producing a material that, when added in any proportions to bentonite, will give the maximum gelling effect. From 0.5% to 10% of calcined dolomite or magnesite has proved useful for various purposes in improving the gel value or plasticity. The advantage of using alkaline substances having the same hydrogen ion concentration as given by a mixture of magnesium oxide and water is the fact that the bentonite maintains to a large degree its reversibility. The hydrating action or the avidity of Portland cement for water tends to diminish the reversibility. In some cases, of course, as herein stated, this reversibility is not desired. In other cases, it is desired to the fullest degree.

Typical commercial alkali earth silicates include any type of Portland cement, some types of natural cement, blast furnace slag and combinations of lime and sodium silicate. The most desirable gel strengthener on account of its other properties, its commercial availability and cheapness, is ordinary Portland cement. The amount of Portland cement required is dependent upon the stiffness of the gel desired. Much improvement in the jelling properties is obtained with as little as five per cent of Portland cement based upon the hydrous silicate of alumina used. A desirable quantity is about twenty per cent for many purposes. In those cases in which the property of the cement enters into the composition, any amount of cement may be used. In many cases, a mixture of equal parts of cement and the swelling clay is satisfactory.

Other substances affecting the gel value of bentonite within the scope of this invention include magnesium borate basic carbonate, fluoride, phosphate, bismuth salts and most metal borates, phosphates, fluorides and subcarbonates.

One of the important features of this invention is dependent upon the fact that when this alkali earth silicate of alumina such as Portland cement is used in conjunction with the swelling clay, the reversibility of the swelling action is overcome. For example, if ordinary bentonite, which swells upon the addition of water, is dried and water again added, the bentonite will again swell. However, if Portland cement is added in the proportion of twenty pounds of Portland cement to eighty pounds of bentonite, the jelling power of the bentonite is increased from two to ten fold. When this hydrated mixture is now dried and water again added to it, it has almost completely lost its jelling power or its ability to take on water so that the combination may then be said to be irreversible. This property makes this invention particularly useful because of the increase in waterproofing properties by reason of the decreased ability to swell or take on water after having once swelled and dried. In the use of this invention, it is desirable to provide for a dried substance which can be transported without being previously mixed with water. This dried substance then when ready for use is capable of being mixed with water to form plastics or emulsions of the consistency desired.

Among the uses to which this material may be put therefore are (1) the manufacture of cheap paints. For such purposes, a typical mix would be approximately as follows: natural hydrated silicate, gelatinizing clay or bentonite such as is found near Death Valley, California, or in the Black Hills District in Wyoming, may be used as the basic material. White Portland cement is intimately mixed with it. Heavy hydrocarbon oil or linseed oil may be added. When the material is ready to use, it is thoroughly mixed with water forming a thick emulsion which may be applied as a paint. A typical mix would be as follows:

| | Parts |
|---|---|
| White gelatinizing clay | 25 |
| White Portland cement | 25 |
| White zinc oxide | 25 |
| Heavy hydrocarbon oil or drying oil | 50 |

This material may be packed and stored indefinitely in containers and when ready to use is mixed with a sufficient amount of water to give a workable consistency. In a typical instance, this would depend upon the character of the cement and upon the character of the gelatinizing clay. Five hundred parts of water more or less, is added to give the proper working consistency and this is then applied to the surface by means of a spray or brush. The action of the white Portland cement which is preferably of the quickly hardening variety is to increase the gelatinizing property of the gelatinizing clay. For example, in a typical instance, the addition of from five per cent to one hundred per cent of Portland cement to gelatinizing clay or bentonite approximately quadruples its gelatinizing power. Furthermore, it has the property of making the gelatinizing action of the clay irreversible so that after the water has formed the gel and the gel has dried out, it becomes much less susceptible to the further action of water. This also is accomplished to some degree by the hydration of the cement. For this reason, the quickly hardening cement is desirable so that the water of combination fully reacts before drying is completely effected.

The composition may be made consisting of the gelatinizing clay and the calcium silicate or cement alone, or it may be made of the gelatinizing clay, the cement and the oil. In the first case, the oil may be added or the water for making the plastic may be added without the oil. In the second case, the water only need be added. In cases where the white color is not necessary, gelatinizing clays that are not perfectly white may be used. Also ordinary Portland cement or blast furnace slag may be used and a dark colored oil or asphalt may be satisfactory in those cases where dark or black coating is to be made. It is desirable that all materials except the oil, be ground to a high degree of fineness as is customary in paint manufacture.

(2) For surface waterproofing of all types of construction materials such as concrete, steel, pipe lines, gypsum plaster products, timber and the like. A typical method would include the application of the emulsion, bentonite, Portland cement, asphalt and water for the manufacture of a coating on freshly laid concrete roads to prevent evaporation of moisture and to provide a surface which would protect the concrete and prevent excessive wearing, particularly in its earlier periods of hydration. A typical mixture for this purpose would be as follows:

| | Lbs. |
|---|---|
| Bentonite | 25 |
| Ordinary Portland cement | 5 |
| High penetration asphalt cement | 25 |

Water—250 to 500 lbs. depending upon the consistency desired and the amount to be applied per square yard.

Approximately the same composition may be used for applying to roads of all kinds, including clay roads, this material taking the place of ordinary road oil. It has the advantage over ordinary road oil in that the asphalt used may be of a harder character than ordinary, the thinning being accomplished with water instead of with light oil or naphtha.

(3) In the manufacture of roofing compositions containing fibrous material. This composition provides a very much more gelatinous inorganic material for making such emulsions than is possible by any other known means. In such cases, just sufficient Portland cement or other silicates or aluminate is used to greatly increase the gelatinizing value of the natural hydrous silicate. When bentonite alone is used for this purpose, ordinarily the hydration is reversible. That is, after having been treated with water and dried it will again take up water. By the use of Portland cement in the composition, the bentonite will hydrate but once, so that the product after drying becomes resistant to the action of water. By the use of a large amount of fibrous material and a large amount of water, this composition forms a basic material for insulation and as roofing, serves not only as insulation against heat but also for waterproofing. The same composition may be used for other insulating purposes as in refrigeration.

(4) This composition also may be used for mixing with mineral aggregate in the laying of cold asphalt pavement. In this case, only enough Portland cement need be used to make the hydration of bentonite or gelatinizing clay irreversible. The composition of gelatinizing clay, Portland cement and asphalt may be made also to include mineral aggregate and this then is mixed with water to facilitate the proper placing and to prevent the mix from packing before it is ready for spreading. A typical mix would be as follows:

| | |
|---|---|
| Bentonite | 50 lbs. |
| Asphaltic cement | 100 lbs. |
| Portland cement | 50 lbs. |
| Mineral aggregate | 800 lbs. |
| Water | 100 gallons |

(5) Compositions also may be used for the integral waterproofing of all types of concrete and for giving plasticity to concrete mixes, and for preserving steel against corrosion which the concrete may be used to incase. For all of the varieties of purposes for which this composition may be used, it is important to very intimately incorporate all the materials. In some cases, it would be necessary to heat the mineral materials so that the bituminous material may be added. When, however, the bituminous or oily material is not semi-solid, solid or highly viscous, the mixing may be done cold.

(6) Various compositions of bentonite, magnesium oxide, Portland cement and heavy powders such as barytes, galena, sphalerite, pyrite, iron filings or scale are used in connection with the drilling of oil wells. Some of the important features include:

a. Increasing the head of liquid in the well to hold back gas or soft water.

b. Forming a smooth, strong wall in the open hole of the well.

c. Prevention of caving of the walls of the well.

d. Lubrication of the slush pump and tools.

e. Removing cuttings from the bit face and from the hole.

(7) Bentonite treated in the manner set forth in this application is a particularly good flocculating agent for use in water filtration. In many cases it takes the place of alum and lime, carrying down with it any suspended matter. It is also useful in making a good filter bed on filter sands and other types of filtering materials. In some cases it is very desirable for use in filter presses.

(8) Treated bentonite is very much superior to straight bentonite for the deinking of newspapers. In some instances it is desirable to add the untreated bentonite to the beater or other vessel in which the newspaper is being deinked and then to add the improver such as magnesium oxide.

(9) Treated bentonite is valuable as a bonding agent for foundry sand, in which case it is used in connection with clay, giving a very superior wet bond for the sand grains. It is also valuable as a core wash for suspending graphite or other facing material. Its use results in very much smoother castings.

(10) Treated bentonite is particularly useful as a sizing vehicle in the manufacture of paper. It prevents excessive amounts of clay or barytes or other mineral that may be used from passing through the screens, holding it in the pulp. For this use the bentonite treated with magnesium oxide is particularly desirable.

(11) In the manufacture of brick and tile, modified bentonite is very useful as a dispersing agent and for giving plasticity with a very large amount of water. This makes it possible to produce a very light weight product, and this product may be subsequently burned to give the proper strength and waterproofness.

(12) Modified bentonite is a valuable bonding agent in the manufacture of refractory cement and all types of refractories. It is useful in the manufacture of fire clay and graphite crucibles, muffles, melting pots and the like. The magnesium oxide treatment is particularly desirable for refractory and ceramic materials.

(13) Treated bentonite for use as soap filler and as a detergent agent is preferably made by using a material that does not readily react upon fatty acids, in which case it is a great improvement over straight bentonite.

(14) Modified bentonite, particularly with the magnesium oxide treatment, is very useful as a lubricant. It is an anticorrosive, and on account of the possibility of using it with large percentages of water it is very valuable in thread cutting. It is used extensively also in grease compositions.

(15) Bentonite and magnesium oxide, on account of the extreme fineness of grain, is very valuable as a filler in paints. It is particularly valuable in calcimines such as in connection with the use of white Portland cement or other white pigment, as its suspending properties are very greatly increased over those of straight bentonite and its consistency is more appropriate.

(16) Treated bentonite is particularly useful in the dehydration, bleaching and desulphurizing of oils. The use of magnesium oxide or other oxide is particularly valuable in the removal of certain types of sulphur compounds.

(17) In the softening of water, bentonite is of particular value when treated with magnesium oxide or with alkalies. It may be used in connection with true zeolites, as it greatly extends the reacting value of the zeolite. When improved with Portland cement, the physical properties of the zeolite are improved. In this case, however, the effect of the Portland cement must be gradually overcome, ordinarily by the use of carbon dioxide.

(18) Treated bentonite is particularly useful as an insecticidal base, since it holds the insecticide, fungicide or germicide in a moist condition and in a dispersed condition for a long period of time.

(19) Other uses include the manufacture of putties, plastics and pharmaceuticals.

I claim as my invention:

1. A composition of matter comprising bentonite and magnesium oxide added thereto, the latter constituent being present in an amount of ten per cent or less.

2. A composition of matter comprising bentonite and dolomite the latter having been burned before mixing at a temperature above 350° C. and below 825° C., the dolomite being present in a minor proportion.

3. A composition of matter comprising bentonite and calcined dolomite, the latter constituent ranging from five-tenths per cent to ten per cent of the bentonite.

4. A composition of matter capable of forming a gel with ten times its weight of water and comprising bentonite and magnesium oxide the magnesium oxide being present in an amount of ten per cent or less of the bentonite.

5. A composition of matter comprising an intimate mixture of bentonite and magnesium oxide, the latter being present to the extent of about five per cent of the mass.

6. A composition of matter comprising an intimate mixture of bentonite and magnesium oxide, the latter being present to the extent of less than five per cent of the mass.

7. A composition of matter including in combination bentonite and a free magnesium oxide-bearing magnesite, the free magnesium oxide content being less than 10% of the mass.

ROY CROSS.